United States Patent
Fojtach (10) Patent No.: US 12,092,726 B2
(45) Date of Patent: Sep. 17, 2024

(54) METHODS AND SYSTEMS FOR MILLIMETER WAVE ASSISTED VEHICLE NAVIGATION

(71) Applicant: Honeywell International Inc., Charlotte, NC (US)

(72) Inventor: Marek Fojtach, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 376 days.

(21) Appl. No.: 17/548,032

(22) Filed: Dec. 10, 2021

(65) Prior Publication Data
US 2023/0184919 A1 Jun. 15, 2023

(51) Int. Cl.
| G01S 13/60 | (2006.01) |
| G01S 13/58 | (2006.01) |
| G01S 13/86 | (2006.01) |
| G01S 13/933 | (2020.01) |
| G01S 19/49 | (2010.01) |

(52) U.S. Cl.
CPC ............ *G01S 13/60* (2013.01); *G01S 13/583* (2013.01); *G01S 13/589* (2013.01); *G01S 13/86* (2013.01); *G01S 13/933* (2020.01); *G01S 19/49* (2013.01)

(58) Field of Classification Search
CPC ......... G01S 13/931; G01S 2013/93271; G01S 13/60; G01S 13/66; G01S 13/867; G01S 13/93; G01S 13/582; G01S 13/589; G01S 13/92; G01S 2013/93272; G01S 13/584; G01S 2013/93274; G01S 7/4056; G01S 13/86; G01S 13/87; G01S 13/588; G01S 19/42; G01S 19/48; G01S 19/52;
(Continued)

(56) References Cited

U.S. PATENT DOCUMENTS 10,989,807 B2    4/2021    Rodenbeck et al.
2017/0254880 A1*   9/2017    Smith ............... G01S 13/87
(Continued)

FOREIGN PATENT DOCUMENTS

| CN | 203480561 U | 3/2014 |
| CN | 110930753 A | 3/2020 |
(Continued)

OTHER PUBLICATIONS

European search report and search opinion Mailed on May 8, 2023 for EP Application No. 22208749, 8 page(s).

*Primary Examiner* — Olumide Ajibade Akonai
(74) *Attorney, Agent, or Firm* — Alston & Bird LLP (57) ABSTRACT

Disclosed are methods and systems for providing millimeter wave assisted vehicle navigation. A method may include generating a frequency-modulated continuous wave (FMCW) signal, transmitting the FMCW signal as radio waves by a plurality of radar transmitters each having a beam direction, receiving reflected radio signals by a corresponding plurality of receivers, and determining individual beam velocities of the vehicle in each of the beam directions. The method may further include combining the individual beam velocities; generating a body velocity vector based on the combined individual beam velocities; combining input from the radar signal processor and a previous known vehicle position; and based on the combined input, providing real-time position and velocity information for the vehicle.

20 Claims, 5 Drawing Sheets

(58) Field of Classification Search
CPC ............. G01S 19/14; B60W 2420/408; G01C 21/1652; G01C 21/165; G01C 21/16
See application file for complete search history.

(56) References Cited

U.S. PATENT DOCUMENTS

| | | | |
|---|---|---|---|
| 2017/0297737 A1* | 10/2017 | Arnold | G01S 19/46 |
| 2017/0309060 A1 | 10/2017 | John | |
| 2017/0315229 A1 | 11/2017 | Pavek et al. | |
| 2018/0128916 A1* | 5/2018 | Bialer | G01S 13/87 |
| 2019/0187267 A1* | 6/2019 | Li | G01S 13/931 |
| 2019/0387060 A1* | 12/2019 | Kentley-Klay | G05D 1/024 |
| 2020/0348408 A1 | 11/2020 | Peng et al. | |
| 2021/0116579 A1* | 4/2021 | Rezaei | G01S 19/25 |

FOREIGN PATENT DOCUMENTS

| | | |
|---|---|---|
| CN | 111398923 A | 7/2020 |
| CN | 109029465 B | 9/2020 |
| CN | 213182008 U | 5/2021 |
| EP | 3677929 A1 | 7/2020 |
| WO | 2019/168410 A1 | 9/2019 |

\* cited by examiner

METHODS AND SYSTEMS FOR MILLIMETER WAVE ASSISTED VEHICLE NAVIGATION

TECHNICAL FIELD

Various embodiments of the present disclosure relate generally to the field of navigation for unmanned aerial vehicles and, more particularly, to methods and systems for millimeter wave assisted vehicle navigation.

BACKGROUND

As the number of applications for unmanned aircraft systems (UAS) and/or unmanned aerial vehicles (UAV) increase, the operational conditions in which these UASs and UAVs are used become more varied and additional challenges emerge. For example, one such challenge that can limit UAV applications is the need for reliable position estimates from a global positioning system (GPS) that relies on satellite coverage. GPS satellite signals may be lost, blocked, or otherwise compromised in a number of ways, and in those circumstances, conventional GPS UAVs may be forced to rely on additional systems for position estimates.

One type of additional system can include an inertial measurement unit (IMU), which integrates accelerometers, gyroscopes, and other sensors to estimate the vehicle's position based on an estimation of the amount and direction of travel since the last known GPS signal. For brief periods of GPS signal loss, the IMU can help smooth out the position estimates. However, as time goes on, these systems will exhibit increasing amounts of error in positioning, and because of this, UAVs are often configured to go into an emergency or fail safe mode when the GPS signal is compromised. Particularly when operating beyond visual line of sight (BVLOS), these modes are generally unable to continue autonomous or remote operation, and can be more focused on safely landing the vehicle than continuing an active mission. As such, loss of GPS signal can render a UAV effectively inoperable.

The present disclosure is directed to overcoming one or more of these above-referenced challenges.

SUMMARY OF THE DISCLOSURE

According to certain aspects of the disclosure, methods and systems are disclosed for millimeter wave assisted vehicle navigation.

For instance, a method for providing for millimeter wave assisted vehicle navigation can include: generating a frequency-modulated continuous wave (FMCW) signal; transmitting, by a plurality of radar transmitters each having a beam direction, the FMCW signal as radio waves; receiving, by a corresponding plurality of receivers, reflected radio signals; and determining, by a radar signal processor, individual beam velocities of the vehicle in each of the beam directions. The method may further include combining the individual beam velocities; generating, based on the combined beam velocities, a body velocity vector; combining input from the radar signal processor including the generated body velocity vector and a previous known vehicle position; and determining, based on the combined input, a real-time position and velocity information for the vehicle.

Moreover, a system may include a plurality of radar transmitters configured to generate and transmit radio signals having a wavelength of about 1 to 10 millimeters (mm), a corresponding plurality of receivers configured to receive reflected radio signals, and a radar signal processor configured to determine a velocity vector for each of the plurality of radar transmitters and corresponding receivers. The system can further include a GPS receiver configured to determine a GPS position for the vehicle, and a navigation system processor configured to combine input from the radar signal processor and the GPS position to provide real-time position and velocity information for the vehicle.

Moreover, another method for providing for millimeter wave assisted vehicle navigation can include: querying a GPS receiver for position information related to the vehicle; determining, in response to querying the GPS receiver, that there has been a GPS signal loss; generating a frequency-modulated continuous wave (FMCW) signal; transmitting, by a plurality of radar transmitters each having a beam direction, the FMCW signal as radio waves having a wavelength of about 1 to 10 mm; and receiving, by a corresponding plurality of receivers, reflected radio signals. The method may further include determining, by a radar signal processor, individual beam velocities of the vehicle in each of the beam directions; generating, based on a combination of the individual beam velocities, a body velocity vector; combining input from the radar signal processor including the generated body velocity vector, input from an inertial measurement unit, and a previous known vehicle position; and providing, based on the combined inputs, real-time position and velocity information for the vehicle.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for unmanned aerial vehicles and, more particularly, to methods and systems for millimeter wave assisted vehicle navigation.

In general, the present disclosure is directed to methods and systems that address one or more of the above challenges by providing navigation information using millimeter wave radar signals to improve position estimates, particularly during a loss of GPS signal. For instance, a system may provide the vehicle with accurate speed and direction information determined from a plurality of millimeter wave radar transmitters and receivers. This determination may be made with or without input from other navigation sensors and systems, for example, an IMU. The systems and/or methods of the present disclosure for millimeter wave assisted vehicle navigation may allow a vehicle such as a UAV to operate and navigate during a GPS signal loss by providing accurate speed and directional information using millimeter wave radar, which does not rely on satellite signals. By improving position estimate accuracy during GPS signal loss, vehicles may be able to avoid entering emergency or fail safe modes that limit vehicle functionality. Further, even absent a loss of GPS signal, methods and systems for using millimeter wave assisted vehicle navigation may be able to improve the positional, speed, and/or directional estimate accuracy.

While this disclosure describes the methods and systems with reference to aircraft, it should be appreciated that the present methods and systems may be applicable to various other vehicles that navigate at least in part based on GPS and/or IMU systems.

Figure 1:
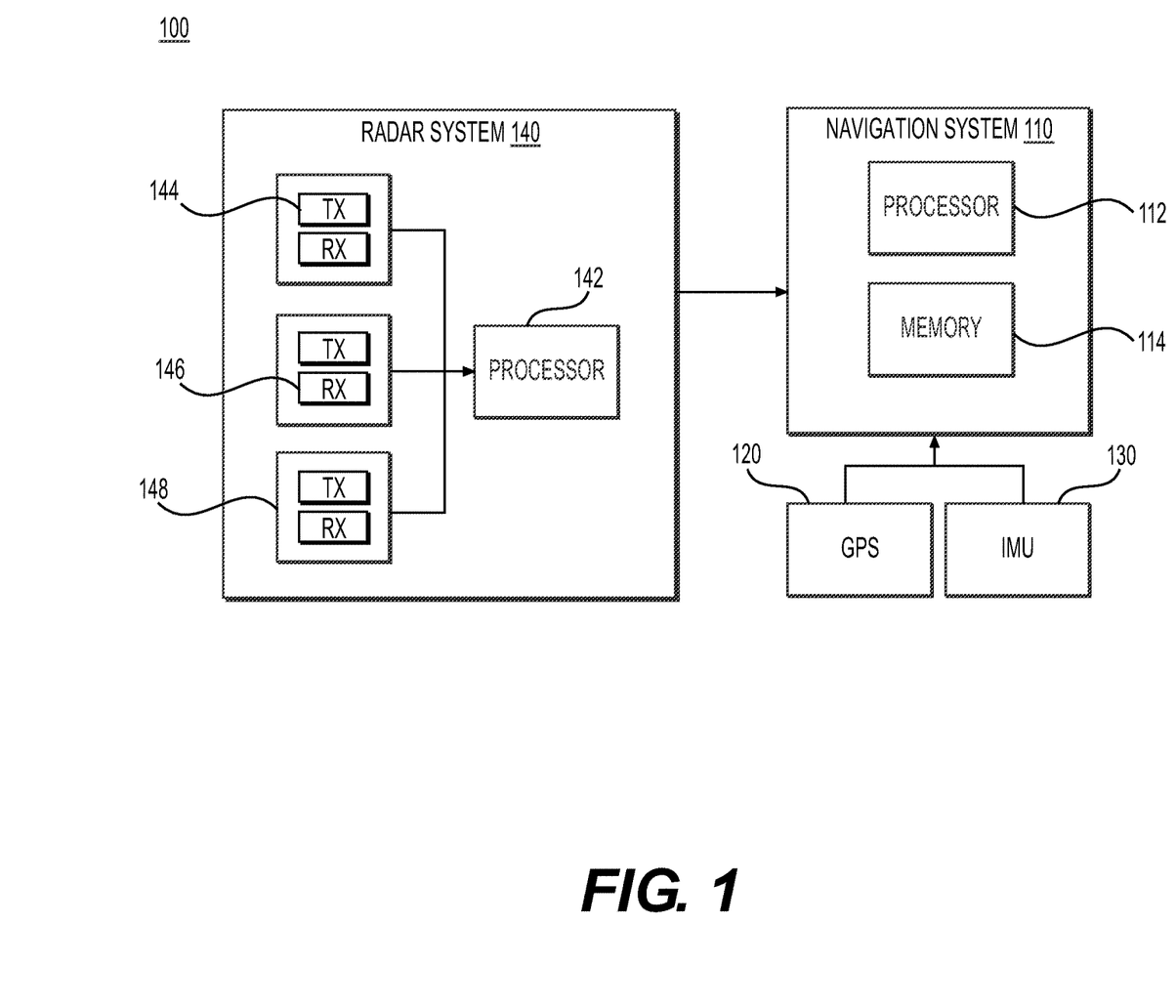
FIG. 1 depicts an exemplary system environment in which methods, systems, and other aspects of the present disclosure may be implemented.

FIG. 1 depicts an example of a system environment 100 in which methods, systems, and other aspects of the present disclosure may be implemented. The system environment 100 of FIG. 1 may represent, for example, components included on or in a vehicle, and may include a navigation system 110, a GPS receiver 120, an IMU 130, and a radar system 140.

Navigation system 110 can be in communication with the sensing systems including GPS receiver 120, IMU 130, and radar system 140, and can include a processor 112 and a memory 114. Navigation system 110 may also be configured to monitor various other aspects of the vehicle's operation, including, for example, other sensors on the vehicle such as altimeters, airspeed indicators, compasses, artificial horizons, attitude indicators, fuel/battery level sensors, and/or optical environment sensors (e.g. lane departure sensors). Navigation system 110 can be tasked with ascertaining and updating the vehicle position provided to other vehicle systems to enable autonomous and/or remote operation.

Navigation system 110 can be provided with GPS receiver 120 that may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. GPS receiver 120 may determine positioning information for the vehicle. The positioning information may include information about one or more of position (e.g., latitude and longitude, Cartesian coordinates), altitude, speed, heading, or track, etc. for the vehicle. GPS receiver 120 can transmit the positioning information to navigation system 110.

IMU 130 may include one or more accelerometer(s), one or more gyroscope(s), and/or one or more magnetometer(s) to determine the position and/or orientation of a vehicle. This position and/or orientation may be calculated from a combination of data including, for example, one or more of: acceleration in one or more dimensions from the accelerometer(s), a rate of angular motion from the gyroscope(s), and the orientation of the vehicle from the magnetometer(s). When this information is mapped over time, it can allow navigation system 110 to estimate the vehicle's speed and direction during brief periods of GPS signal loss. However, longer instances of GPS signal loss can lead to IMU drift, as even small margins of error compound over time.

Radar system 140 can be self-contained or modular, and can include a processor 142 along with a plurality of transmitters 144 and receivers 146. In some embodiments, transmitters 144 and receivers 146 may be arranged in receiver/transmitter pairs 148, with each transmitter 144 being associated with a receiver 146. In some embodiments, each receiver/transmitter pair 148 may be integrated into a single chip form factor for ease of installation, wiring, and replacement.

Processor 142 and/or another suitable component can generate a signal to be transmitted by one or more of the transmitters 144 as radio waves. Transmitters 144 can be configured to generate and transmit radio signals having a frequency of about 30-300 GHz, and wavelength of about 1 to 10 mm. For example, the transmitters may generate radio signals having a frequency of about 80 GHz and a wavelength of 4 mm. As the radio waves travel through the environment, they are reflected by a surface or object such as the ground and the reflected signal is received by a corresponding receiver 146. The process of signal generation, transmission, and receipt of the reflected signal are discussed below with respect to FIG. 3.

Figure 2:
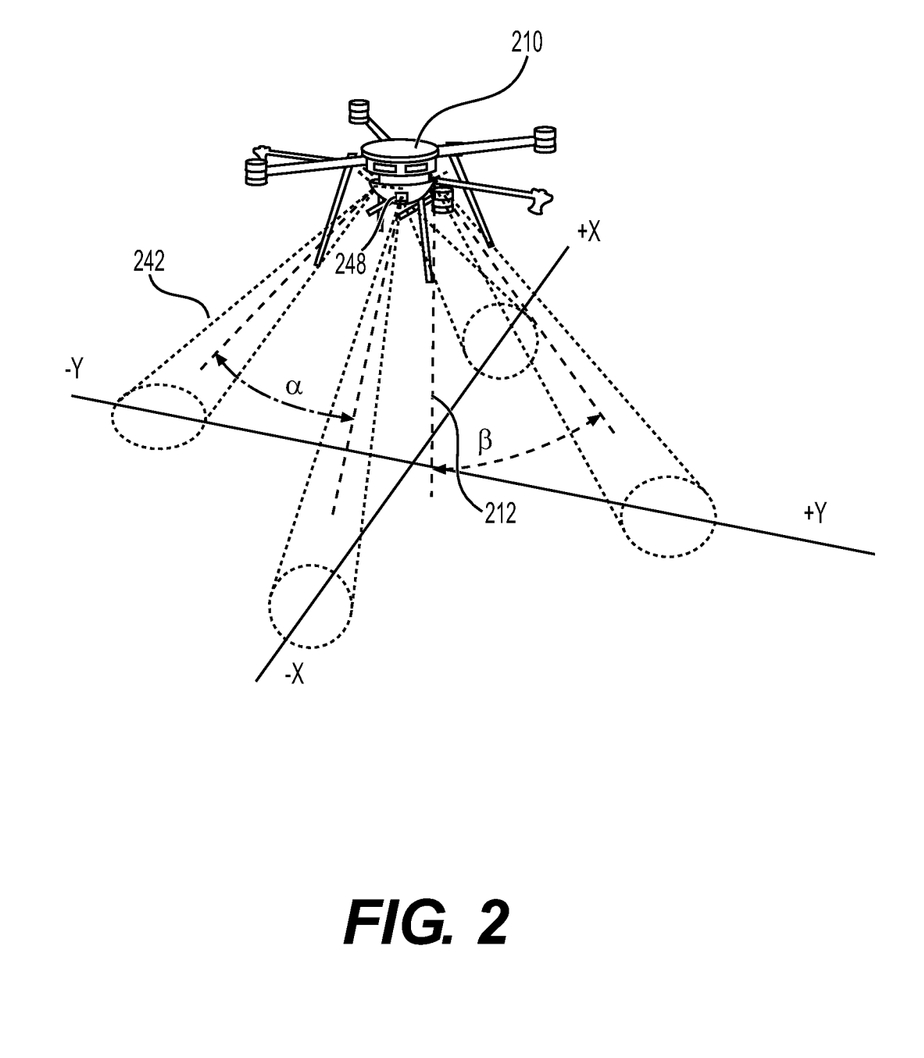
FIG. 2 depicts an exemplary vehicle having a plurality of radar transmitters and receivers on which methods, systems, and other aspects of the present disclosure may be implemented.

An exemplary vehicle 210 is illustrated in FIG. 2, in accordance with the present disclosure. Vehicle 210 can be, for example, a UAV, a helicopter, airplane, automobile, military vehicle, boat, submarine, or other aquatic vehicle. As depicted in FIG. 2, vehicle 210 is a UAV having four transmitter/receiver pairs 248. Each of the four transmitter/receiver pairs 248 is configured to transmit a directional radar signal in a beam 242. The beams 242 transmitted from each transmitter/receiver pair 248 may have a direction and a beam width angle. The direction of the beams 242 may be oriented such that during vehicle travel, the beams form angles with respect to the ground ($\beta$) and with respect to one another ($\alpha$).

Because each transmitter/receiver pair 248 is configured to determine a speed in the direction of the radar beam, three or more properly oriented beams can be able to provide individual components that can be combined to determine a directional vector of the vehicle. Also, because the beams 242 have to be reflected (in order to be received to calculate the speed in the beam direction), beams 242 should be angled such that the distance traveled between the transmitter and the ground is within a range capable of being detected by the receiver of the respective transmitter/receiver pair 248.

If beam 242 has too great an angle $\beta$ with respect to the ground, the signal may have too far to travel to be strong enough to be properly received upon reflection. Further, the beam angle $\beta$ should be great enough that the transmitter/receiver pairs 248 aren't sensing the speed in substantially similar direction. For these reasons, a 13 between 0 and 30 degrees from vehicle axis 212, such as around 15 degrees, is generally desirable. With respect to $\alpha$, it is generally preferable to have beams 242 substantially evenly spaced around vehicle 210. For example, as depicted in FIG. 2, each of the four transmitter/receiver pairs 248 it transmitting a beam 242 that has an angle $\alpha$ of approximately 90 degrees apart from the adjacent beams 242. In an application using five transmitter/receiver pairs 248 and beams 242 would likely have an $\alpha$ of about 72 degrees.

Figure 3:
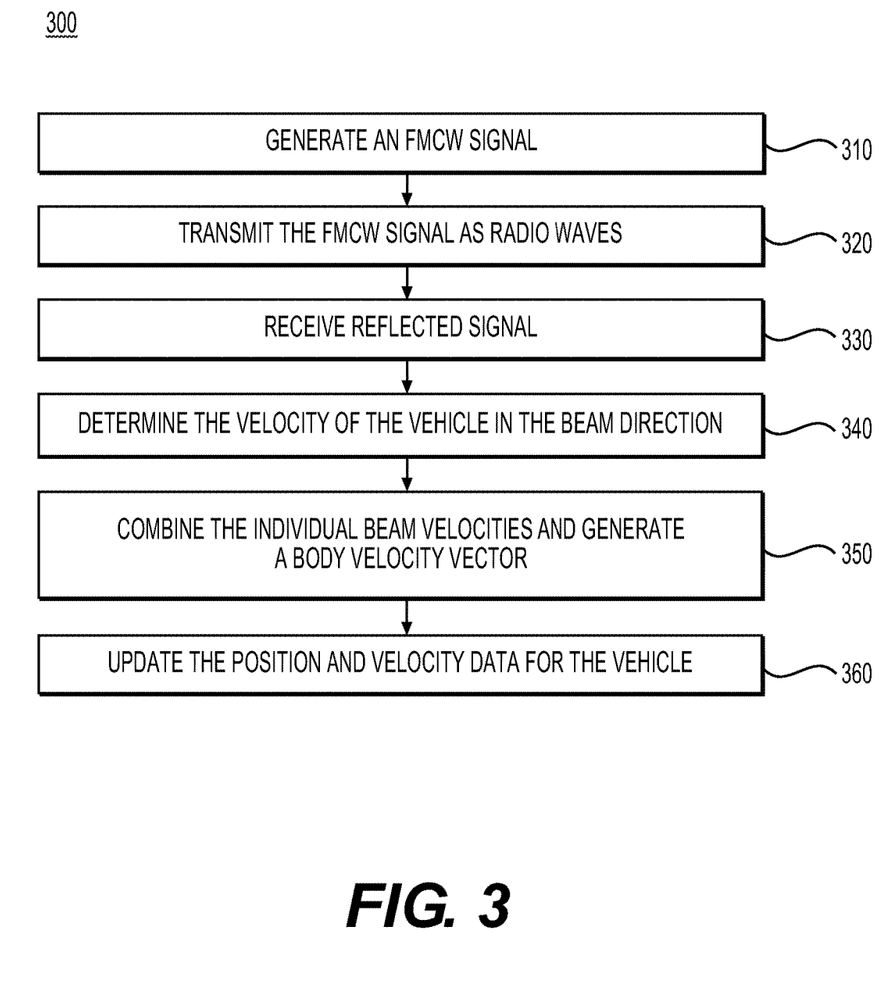
FIG. 3 depicts a flowchart for an exemplary process for millimeter wave assisted vehicle navigation, according to one or more embodiments.

FIG. 3 illustrates an exemplary method 300 for providing millimeter wave assisted vehicle navigation in accordance with embodiments of the present disclosure. It should be understood that the steps described herein, and the sequence in which they are presented, are merely illustrative such that additional and/or fewer steps may be included without departing from the scope of the present disclosure.

Beginning at step 310, processor 142 of radar system 140 may be configured to generate the radar signal to be transmitted by transmitters 144. The signal generated by processor 142 is substantially continuous, with a frequency that is modulated to vary over time. This type of signal is referred to as a frequency-modulated continuous wave (FMCW) radar signal. By varying the frequency over time, the phasing of the reflected signal can be compared to the transmitted signal to determine a phase difference indicative of the speed measurement in the beam direction.

Once the FMCW signal is generated, at step 320, radar system 140 may then transmit the FMCW signal as radio waves emitted by transmitters 144. As discussed with respect to FIG. 2, these radio signals are transmitted in a general beam direction such that they will be reflected off of a surface (e.g., the ground). As the reflected signal travels back toward vehicle 210, they can be received by receivers 146, at step 330.

Once the reflected signal is received, the velocity of the vehicle in the beam direction can be determined, as step 340. Due to the use of an FMCW signal, it is possible to determine the difference in phase between the transmitted, and reflected signals. The phase difference can be determined, for example, using a fast Fourier transform (FFT). This phase difference allows processor 142 to calculate the distance traveled by the beam, and as that distance traveled changes over time, the velocity can be determined. The velocity can be determined, for example, using a second FFT. Because each beam is configured to measure distance and velocity in the direction of the beam, the initially determined velocities for each beam will be only with respect to the beam direction.

At step 350, the plurality of individual velocities in the beam direction can be combined by, for example, processors 142 or 112 and a velocity vector with respect to the vehicle can be generated. This overall body velocity vector can be generated as the sum of the individual beam velocities as a result of the fixed relationship between the vehicle and each of the beams 242. The individual beam velocities may be combined using a transformation matrix populated with values that are based on the known angles with respect to the ground (β) and with respect to one another (α). For example, in the configuration of transmitter/receiver pairs 248 illustrated in FIG. 2, each beam 242 is positioned along the X and Y axes and aimed toward the ground. Each of the individual beam velocities will include components of the body velocity vector in two dimensions, 1) in the X or Y direction and 2) in the vertical or "Z" direction. Because the beams are at fixed angles with respect to one another, they can be combined to form a body velocity vector in a coordinate frame based on the body of the vehicle.

At step 360, the body velocity vector may then be used by navigation system 110 to update the position and velocity data from the last or previously known or estimated information available to provide a real-time position and velocity for the vehicle. For example, using the roll, pitch, and yaw angles determined from the IMU data, the body velocity vector can be transformed to the navigation frame. In turn, these estimates are used to correct the position, velocity, and attitude computed by the inertial system.

Figure 4:
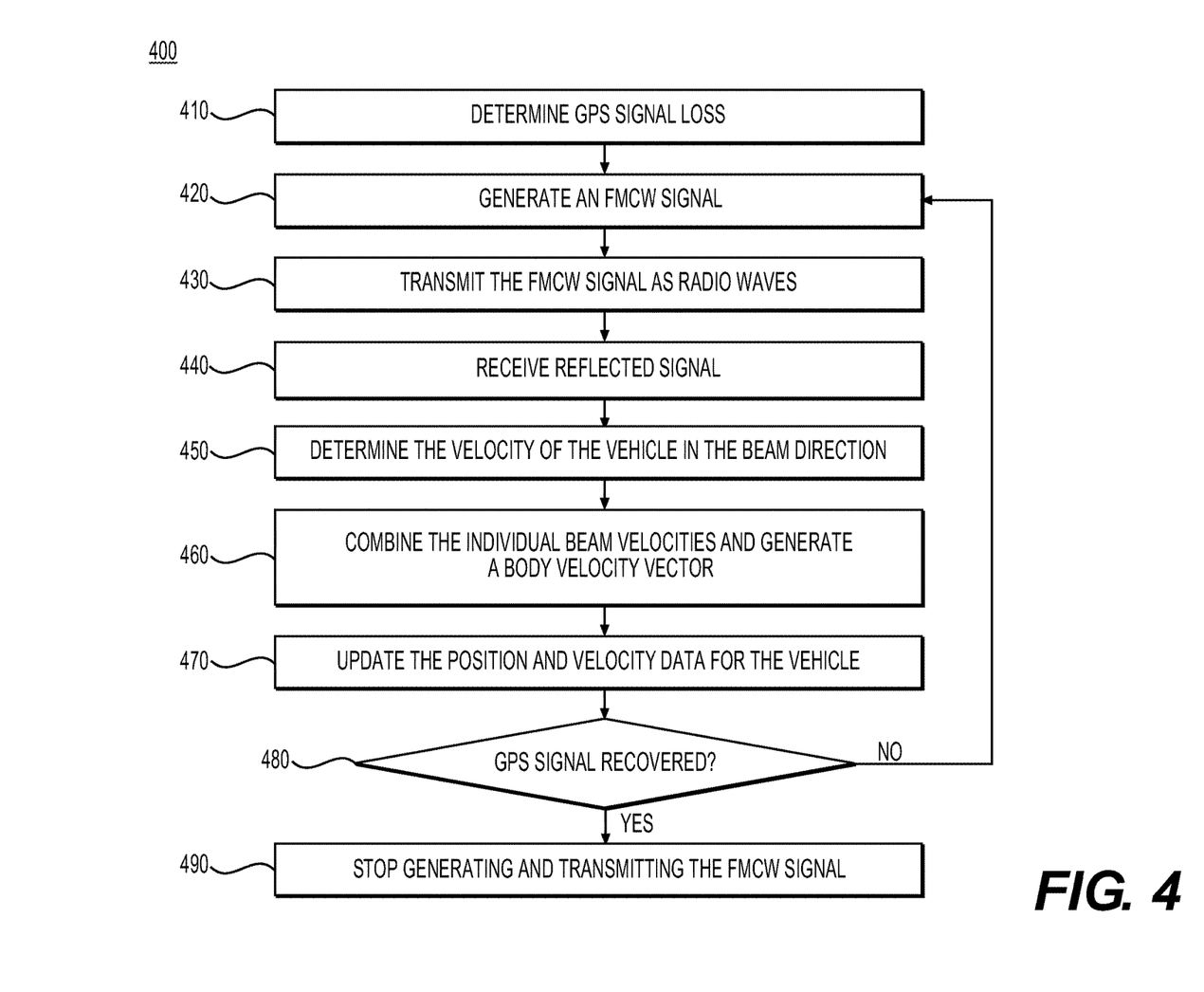
FIG. 4 depicts a flowchart for an exemplary process for providing millimeter wave assisted vehicle navigation in response to a GPS signal loss, according to one or more embodiments.

In some embodiments, radar system 140 can be used as a failsafe or back-up for navigation system 110 in the event of a GPS signal loss. An exemplary method 400 for using radar system 140 in such a manner is depicted in FIG. 4.

The method may begin, at step 410, with the determination that the GPS signal has been lost. In some embodiments, this signal loss can be determined by navigation system 110 as it continuously queries and/or monitors GPS receiver 120. In some embodiments, instead of or in addition to the monitoring of GPS receiver 120, an operator may make the determination that an accurate GPS signal has been lost in response to the detection of conditions such as GPS signal jamming, blocking, spoofing, or multipath error. Once the determination of GPS signal loss or instability has been made, radar system 140 may proceed in a manner similar to that described above with respect to FIG. 3.

Accordingly, at step 420, processor 142 of radar system 140 may generate the FMCW signal, which can then be transmitted by transmitters 144, at step 430. At step 440, the reflected signal can be received by receivers 146, and the velocity of the vehicle in the beam direction can be determined at step 450. At step 460, the plurality of individual velocities in the beam direction can be combined, and a velocity vector with respect to the vehicle can be generated, and at step 470, navigation system 110 can update the position and velocity data for the vehicle.

Next, navigation system 110 may check the status of the GPS signal, at step 480, to determine whether or not radar system 140 should remain active. In the event that the GPS signal has been recovered (step 480: Yes), the method can proceed to step 490 and stop generating and transmitting the FMCW signal. However, if the GPS signal has not been recovered (step 480:No), navigation system 110 may continue to cause radar system 140 to generate and transmit the FMCW radar signal so that the position and velocity data can continue to be updated based on the radar body velocity vector.

Methods and systems for millimeter wave assisted vehicle navigation in accordance with the present disclosure may be able to provide a vehicle with increased position and velocity information in a GPS signal denied environment. Increased accuracy of position and velocity information may allow a vehicle to continue to navigate autonomously and/or remotely in circumstances where GPS/IMU only vehicles may be forced in to a safe-landing or other restricted operational modes. Because a lack of accurate position and velocity data may result in vehicle collision or loss, a vehicle that is capable of navigating spaces in the absence of reliable GPS signals may be able to traverse spaces that would otherwise be treacherous to the vehicle and/or environment. Because GPS signals can be jammed, blocked, and/or spoofed, the ability to operate autonomously and/or remotely in the absence of these signals may increase the applications for autonomous and or remote vehicles.

Figure 5:
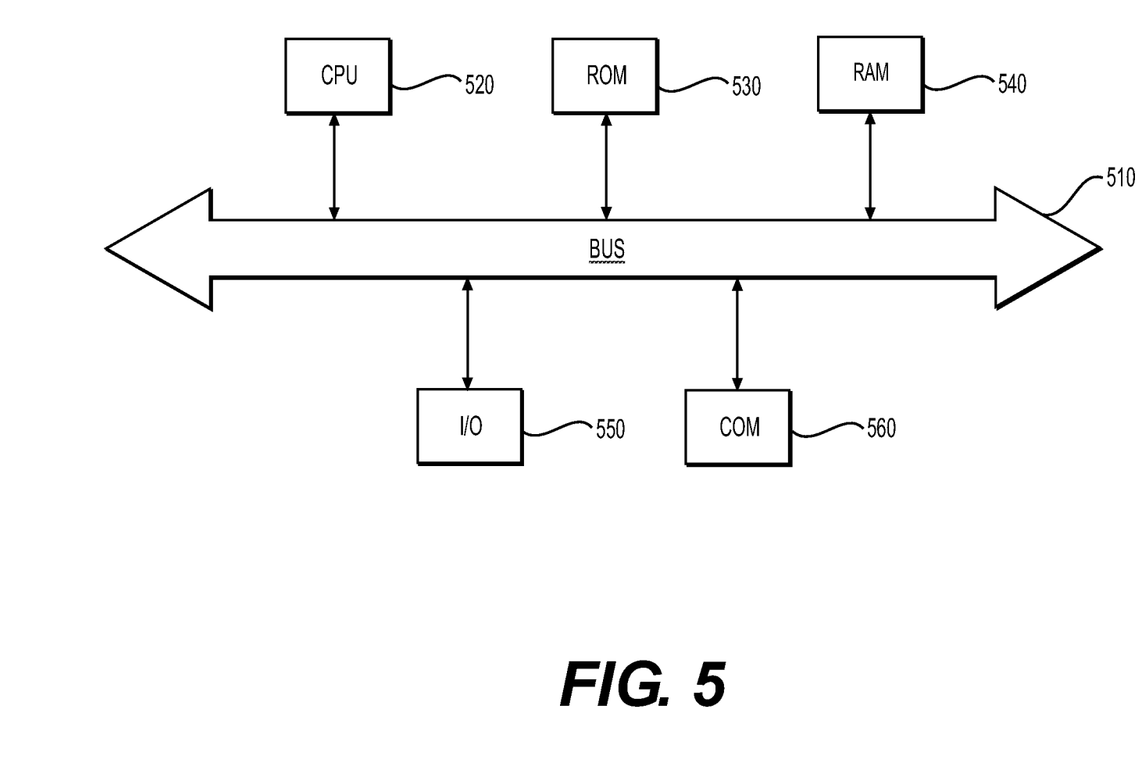
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing navigation information for a vehicle, the method comprising:
   determining that there has been a GPS signal loss with respect to a GPS receiver;
   in response to determining that there has been a signal loss, generating a frequency-modulated continuous wave (FMCW) signal;

transmitting, by a plurality of radar transmitters each having a beam direction, the FMCW signal as radio waves;
receiving, by a corresponding plurality of receivers, reflected radio signals;
determining, by a radar signal processor, individual beam velocities of the vehicle in each of the beam directions;
combining the individual beam velocities;
generating, based on the combined beam velocities, a body velocity vector;
combining input from the radar signal processor including the generated body velocity vector and a previous known vehicle position; and
determining, based on the combined input, a real-time position and velocity information for the vehicle.

2. The method of claim 1, further including:
prior to generating the FMCW signal, querying the GPS receiver for position information related to the vehicle.

3. The method of claim 2, wherein the previous known vehicle position is ascertained from one of the GPS receiver or data from an inertial measurement unit.

4. The method of claim 3, wherein
determining that there has been a GPS signal loss is in response to querying the GPS receiver.

5. The method of claim 2, wherein, after providing real-time position and velocity information for the vehicle, querying the GPS receiver for position information related to the vehicle.

6. The method of claim 5, further including:
wherein
determining that there has been a GPS signal loss is in response to querying the GPS receiver.

7. The method of claim 1, wherein the plurality of radar transmitters and the corresponding plurality of receivers includes at least three corresponding transmitter and receiver pairs.

8. The method of claim 7, wherein the beam directions of the plurality of radar transmitters are positioned to be about 90 degrees apart, and to have an angle with respect to the ground between 0 and 30 degrees.

9. The method of claim 1, further including:
measuring one or more dimensions of acceleration of the vehicle using an inertial measurement unit; and
wherein the step of combining input from the radar signal processor and a previous known vehicle position to provide real-time position and velocity information for the vehicle includes combining input from the inertial measurement unit.

10. A navigation system for a vehicle, the navigation system comprising:
a plurality of radar transmitters configured to generate and transmit radio signals having a wavelength of about 1 to 10 mm;
a corresponding plurality of receivers configured to receive reflected radio signals;
a radar signal processor configured to determine a velocity vector for each of the plurality of radar transmitters and corresponding receivers;
a GPS receiver configured to determine a GPS position for the vehicle; and
a navigation system processor configured to determine that there has been a GPS signal loss with respect to the GPS receiver, combine input from the radar signal processor and the GPS position to provide real-time position and velocity information for the vehicle;
wherein the radar signal processor is further configured to generate a frequency-modulated continuous wave (FMCW) signal in response to the determination that there has been a signal loss, the generated FMCW signal being configured for transmission as radio waves.

11. The navigation system of claim 10, wherein the plurality of radar transmitters comprises at least three radar transmitters.

12. The navigation system of claim 11, wherein the plurality of radar transmitters are positioned such that they are about 90 degrees apart.

13. The navigation system of claim 10, wherein the plurality of radar transmitters are positioned to have an angle with respect to the ground between 0 and 30 degrees.

14. The navigation system of claim 10, wherein the radio signals transmitted by the plurality of radar transmitters are continuously emitted.

15. The navigation system of claim 14, wherein the continuously emitted radio signals emitted by the plurality of radar transmitters have a frequency that is varied with time.

16. The navigation system of claim 10, wherein the input from the radar signal processor to the navigation system processor includes a respective velocity vector for each of the plurality of radar transmitters and corresponding receivers.

17. The navigation system of claim 10, wherein the input from the radar signal processor to the navigation system processor includes an overall body velocity vector.

18. The navigation system of claim 10, further comprising an inertial measurement unit configured to measure one or more dimensions of acceleration of the vehicle, and wherein the navigation system processor receives input from the inertial measurement unit.

19. The navigation system of claim 10, wherein each corresponding pairing of radar transmitter and receiver is integrated into a single chip.

20. A method of providing navigation information for a vehicle, the method comprising:
querying a GPS receiver for position information related to the vehicle;
determining, in response to querying the GPS receiver, that there has been a GPS signal loss;
generating a frequency-modulated continuous wave (FMCW) signal;
transmitting, by a plurality of radar transmitters each having a beam direction, the FMCW signal as radio waves having a wavelength of about 1 to 10 mm;
receiving, by a corresponding plurality of receivers, reflected radio signals;
determining, by a radar signal processor, individual beam velocities of the vehicle in each of the beam directions;
generating, based on a combination of the individual beam velocities, a body velocity vector;
combining input from the radar signal processor including the generated body velocity vector, input from an inertial measurement unit, and a previous known vehicle position; and
providing, based on the combined inputs, real-time position and velocity information for the vehicle.

* * * * *